United States Patent
Cordier et al.

(10) Patent No.: US 7,626,687 B2
(45) Date of Patent: Dec. 1, 2009

(54) OPTICAL IMAGING DEVICE SUITABLE FOR FORMING IMAGES OF FINGERPRINTS

(75) Inventors: Chantal Cordier, Le Kremlin Bicetre (FR); Miguel Boutonne, Fontenay le Vicomte (FR); Francois Riguet, Loudun (FR)

(73) Assignee: Sagem Defense Securite, Paris (FR)

( * ) Notice: Subject to any disclaimer, the term of this patent is extended or adjusted under 35 U.S.C. 154(b) by 575 days.

(21) Appl. No.: 10/595,668

(22) PCT Filed: Nov. 10, 2004

(86) PCT No.: PCT/FR2004/002896

§ 371 (c)(1),
(2), (4) Date: May 3, 2006

(87) PCT Pub. No.: WO2005/050541

PCT Pub. Date: Jun. 2, 2005

(65) Prior Publication Data

US 2008/0291427 A1  Nov. 27, 2008

(30) Foreign Application Priority Data

Nov. 14, 2003 (FR) .................................. 03 13379

(51) Int. Cl.
*G06K 9/74* (2006.01)
(52) U.S. Cl. ........................................ 356/71; 356/445
(58) Field of Classification Search .................. 396/15; 283/68; 382/116, 124; 356/71, 445
See application file for complete search history.

(56) References Cited

U.S. PATENT DOCUMENTS 5,077,803 A * 12/1991 Kato et al. ................... 382/124

(Continued)

FOREIGN PATENT DOCUMENTS

EP    0 308 162 A    3/1989

(Continued)

OTHER PUBLICATIONS

Seigo Igaki et al. "Holographic Fingerprint Sensor" Fujitsu-Scientific and Technical Journal, Fujitsu Limited. Kawasaki, JP vol. 25, No. 4, Dec. 21, 1989, pp. 287-296, XP000103957, figures 11, 17.

(Continued)

*Primary Examiner*—Tarifur Chowdhury
*Assistant Examiner*—Michael LaPage
(74) *Attorney, Agent, or Firm*—Miller, Matthias & Hull

(57) ABSTRACT

An optical imaging device for forming optical images of fingerprints of a finger, the device comprising: an optical plate having a portion at one end of a main face that is provided for illuminating the finger through the plate, the reflected light beam propagating with multiple reflections inside the plate to the other end thereof, which end presents an inclined end face; a focusing lens facing the end face with the lens having its axis situated in the midplane of the plate; and a mirror for directing the light beam leaving the end face onto the axis of the lens.

16 Claims, 3 Drawing Sheets

U.S. PATENT DOCUMENTS

| | | | |
|---|---|---|---|
| 6,122,394 A * | 9/2000 | Neukermans et al. | 382/124 |
| 6,185,319 B1 * | 2/2001 | Fujiwara | 382/127 |
| 7,315,632 B2 * | 1/2008 | Spycher et al. | 382/124 |

FOREIGN PATENT DOCUMENTS

| | | |
|---|---|---|
| EP | 0 348 182 A | 12/1989 |
| EP | 0 359 554 A | 3/1990 |
| WO | WO 94/22371 | 10/1994 |
| WO | WO 97/43735 | 11/1997 |

OTHER PUBLICATIONS

D. Maltoni et al.: "Handbook of Fingerprint Recognition" Jun. 2003, Springer New York, USA XP002320999, 2.4 Live-scan Fingerprint Sensing p. 59-p. 64.

Eguchi S. et al. "Holographic Fingerprint Sensor" Proceedings of the Spie, Spie, Bellingham, VA, US, vol. 1051, Jan. 17, 1989, pp. 129-134, XP000671921 Figures 1, 5.

* cited by examiner

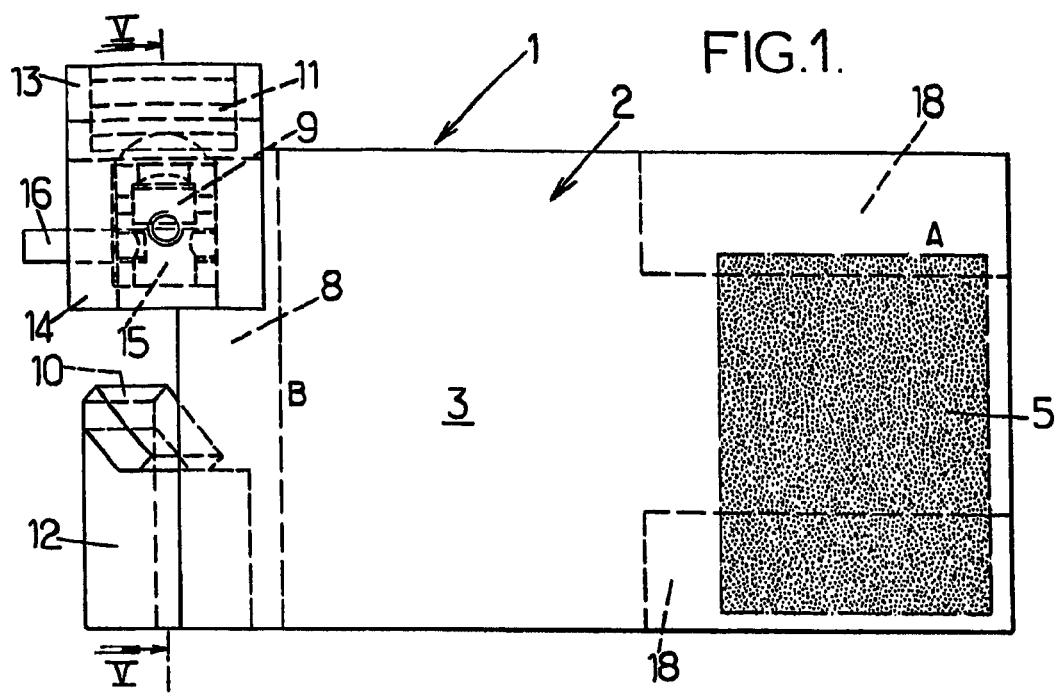
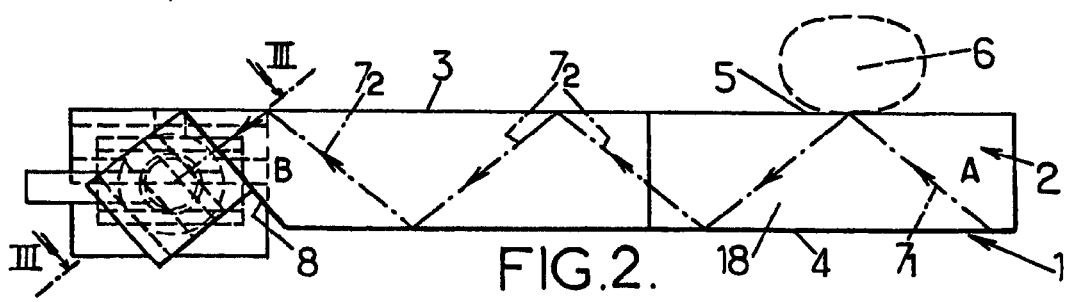
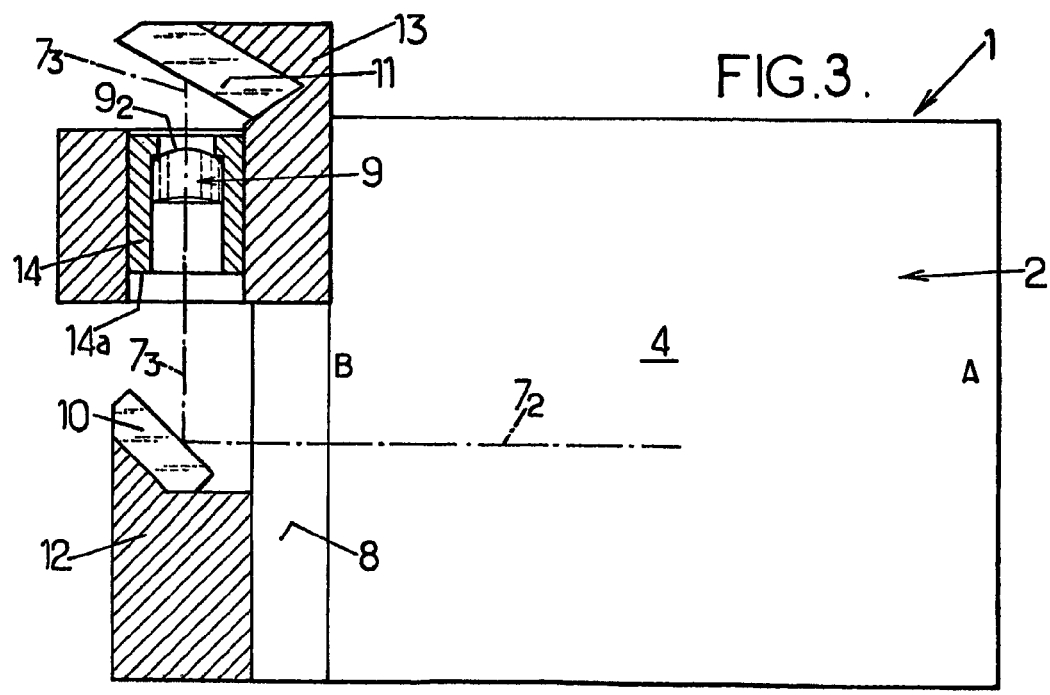

OPTICAL IMAGING DEVICE SUITABLE FOR FORMING IMAGES OF FINGERPRINTS

CROSS-REFERENCE TO RELATED APPLICATION

This is the U.S. National Phase of International Application No. PCT/FR2004/02896 filed 10 Nov. 2004, the entire disclosure of which is incorporated herein by reference.

FIELD OF THE INVENTION

The present invention generally relates to the field of taking fingerprints, and the invention relates more particularly to improvements provided to optical imaging devices suitable for forming optical images of fingerprints of a finger, such a device comprising:

- an optical plate having first and second opposite main faces, at least a portion of said first main face situated in the vicinity of a first end of the plate constituting a finger-press surface for a finger;
- at least one light source situated facing a face of said plate at said first end thereof, in order to illuminate said finger through the plate; and
- imaging means including a focusing lens that has an inlet surface and a outlet surface determining a magnification factor, and that is situated downstream from the optical plate.

BACKGROUND OF THE INVENTION

It is explicitly emphasized herein that the invention relates exclusively to an optical device suitable for forming optical images of fingerprints, and that it does not relate to equipment situated downstream from said device for the purposes of scanning/recording the resulting image, detecting characteristic points of fingerprints, and providing information about the person concerned.

In particular, devices for detecting fingerprints can be used to authenticate a person so as to authorize that person to perform some determined operation: under such circumstances, the device for detecting fingerprints is often accompanied by some other apparatus that the authenticated person is to be authorized to use (a computer, an automated teller machine (ATM), . . . ). The space available for receiving the fingerprint detector device is then small, and in particular the optical imaging device incorporated in the fingerprint detection device must be made to be as compact as possible, and in particular with thickness (or height) that is as small as possible. By way of concrete example, at least certain specifications require the optical imaging device to present a thickness (or height) that does not exceed about 5 millimeters (mm).

Various embodiments of optical imaging devices for forming optical images of fingerprints are already known, including for example the device disclosed in document EP 0 308 162 which presents the dispositions set out in the introduction. Nevertheless, those known devices do not enable practical requirements to be satisfied completely.

SUMMARY OF THE INVENTION

An object of the invention is to provide an optical imaging device for optically sensing fingerprints that can be made in a form that is as compact as possible, and in particular with small thickness not exceeding about 5 mm, and that is structurally as simple as possible with a minimum number of components so that it is caused to be as simple, as fast, and as inexpensive as possible to fabricate and assemble.

For these purposes, the invention provides an optical imaging device suitable for forming optical images of fingerprints of a finger, the device, when arranged in accordance with the invention, being characterized in that:

- said first and second main faces, said face in front of which the light source is situated, and the illumination direction of said light source are arranged mutually in such a manner that the light beam emitted by the source and then reaching the finger pressed against said portion of the first main face in order to illuminate said finger, propagates thereafter inside the plate with multiple reflections alternately on the first and on the second main faces thereof in order to reach the second end of the plate opposite from said first end;
- said plate possesses an end face at its second end that is inclined, at least in part, so that the light beam leaves the plate via said inclined end face without being subjected to significant refraction or reflection;
- the focusing lens is disposed facing said inclined face of the second end of the plate with its optical axis extending substantially in the midplane of the plate between said main faces and extending substantially parallel to said inclined face; and
- a first mirror is placed facing the inlet surface of said focusing lens and is oriented in such a manner as to receive a portion of the light beam coming from said end face of the second end of the plate and reflect it towards said inlet surface of the focusing lens along the axis thereof.

By means of the above dispositions, a device can be constituted in which the bulkiest element is constituted by the optical plate and in which all of the other component elements that are functionally associated with the plate can be shaped and dimensioned in such a manner as to be disposed in line with the plate and remain dimensionally within the limits set by the thickness of the plate. In particular, this arrangement, and in particular the transmission of the light beam from one end of the plate to the other, can remain compatible with the plate having a thickness that does not exceed about 5 mm, in compliance with practical requirements.

To make the apparatus for sensing and analyzing fingerprints as compact as possible, it is desirable in particular for the imaging device not to be excessive in extent, and for this purpose, provision can be made for the image focal point of the focusing lens not to be situated in line with the optical plate: for this purpose, the optical imaging device further includes a second mirror disposed facing the outlet surface of said focusing lens and oriented in such a manner that the light beam coming from the focusing lens is reflected transversely (typically perpendicularly) relative to the plate. Advantageously, said second mirror is then oriented in such a manner that the light beam is reflected in a direction going away from the finger-press surface.

In the context of an arrangement of the device that is as simple as possible, the first and second main faces of the plate are mutually parallel.

In order to constitute a device including a minimum number of component parts, and thus being inexpensive to fabricate and install, it is possible to provide for the first mirror to belong to a first projecting part fitted on the end face of the second end of the plate, in such a manner as to extend in line with said plate. In the same manner and for the same reasons, it is also possible to provide for the second mirror to belong to a second projecting part fitted on the end face of the second end of the plate in such a manner as to extend in line with said plate.

In a preferred embodiment, in order to obtain a well-contrasted high-quality image, the optical imaging device includes a diaphragm situated upstream from and close to the focusing lens.

Advantageously, the focusing lens is secured to the end face of said second end of the plate via support means, and in preferred manner, the support means of the focusing lens are arranged to allow the focusing lens to move along its optical axis. In which case, and advantageously, the support means of the lens are constituted in one piece with said second projecting part incorporating the second mirror.

The arrangement of the optical imaging device in accordance with the invention presents the advantage of leaving a choice between various possible solutions for implanting one or more light sources.

In a first possibility, at its first end the plate includes an end face that is inclined at an acute angle relative to said first main face, and the light source is situated facing said inclined end face: the light source then remains within the dimensional limits of the thickness of the plate, such that the device overall is small in thickness.

In a second possibility, at said finger-press portion of the first main face of the plate, at least one side face of the plate is inclined at an angle that is acute relative to said first main face, and the light source is situated facing said inclined side face. Under such circumstances, it is advantageous for both opposite side faces of the plate to be inclined, and for two light sources to be situated facing respective ones of said two inclined side faces, so that the finger is then illuminated bilaterally, thus encouraging the formation of better quality images of fingerprints. Also in this solution, the light source(s) remains) within the dimensional limits set by the thickness of the optical plate.

Whichever solution is retained for implanting the light source(s), it is possible to obtain an illuminating light beam that diverges more and that is therefore better adapted to cover the finger by making provision for the inclined face(s) of the plate situated towards the first end thereof to be curved in the thickness of the plate with their concave faces facing outwards.

In a preferred variant embodiment, provision can be made for the light source not to be a point source, presenting a significant surface area and being placed facing the bottom main face of the plate, substantially facing said finger-press portion provided on the top main face, and directed towards it, in which case, advantageously, the light source is a matrix of light-emitting diodes, with a ground surface interposed between the light source and the bottom face of the plate.

BRIEF DESCRIPTION OF THE DRAWINGS

The invention will be better understood on reading the following detailed description of certain detailed embodiments given purely by way of illustration. In the description, reference is made to the accompanying drawings, in which:

FIGS. 1 and 2 are respectively a plan view and a side view of an optical imaging device arranged in accordance with the invention;

FIG. 3 is a view from beneath of the device of FIGS. 1 and 2, with an end portion shown in section on line III-III of FIG. 2;

DETAILED DESCRIPTION OF THE INVENTION

Figure 4:
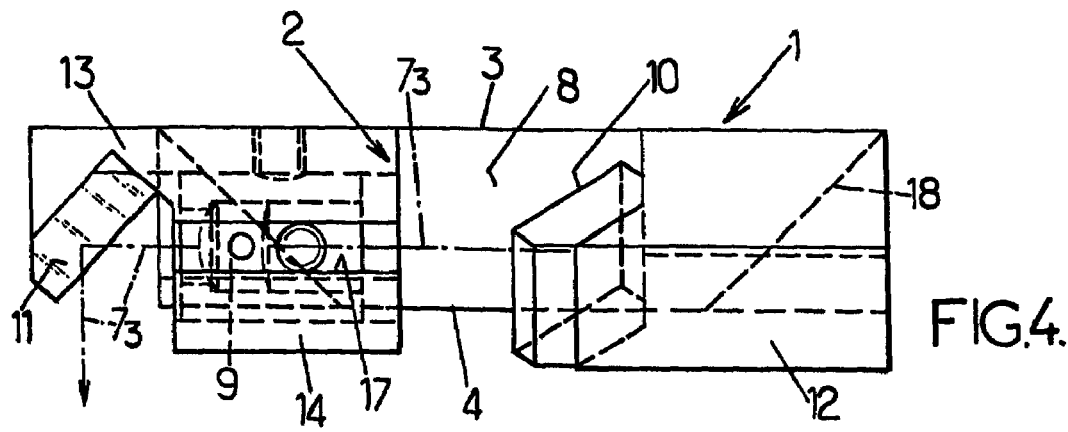
FIG. 4 is an end view showing the left-hand end of the FIG. 1 device.

Reference is made initially to FIGS. 1 to 6 while describing a preferred embodiment of an optical imaging device suitable for forming optical images of fingerprints.

The optical imaging device in accordance with the invention, given overall reference 1, mainly comprises:

an optical plate 2 having a first main face 3 and a second main face 4 opposite the first main face, and in order to make the device simpler to design both mechanically and optically, the two faces 3 and 4 are advantageously parallel to each other as shown in all of the figures; at least one portion 5 (shown shaded in FIG. 1 to distinguish it more clearly from the remainder of the plate) of said first main face 3, situated in the vicinity of a first end A (to the right in FIGS. 1 to 3) of the plate 2 constitutes a finger-press surface for a finger 6; overall, the plate 2 is generally in the form of a rectangular parallelepiped;

at least one light source—described in greater detail below—situated facing a face of the optical plate 2, at said first end A thereof, in order to illuminate the finger through the plate 2;

the first and second main faces 3 and 4 of the plate 2, the face of the plate situated facing the light source, and the direction of illumination of said light source being arranged relative to one another in such a manner that the light beam emitted by the source reaches ($7_1$) the finger 6 pressed against said portion 5 of the first main face 3 so as to illuminate said finger 6, then propagates ($7_2$) inside the plate 2 with multiple reflections taking place alternatively on the first and second main faces 3 and 4 thereof in order to reach the second end B of the plate 2 opposite from the end A;

at its second end B, the plate 2 having an end face 8 which is inclined so as to be struck substantially perpendicularly by the light beam $7_2$ so that it leaves the plate through said inclined face 8 without being subjected to any significant amount of refraction or reflection; and imaging means as described in greater detail below.

By channeling the light beam within the plate 2, using multiple reflections on its opposite main faces 3 and 4, and for a given length of light path, it is possible to bring the two ends of the light path closer together, and thus to provide a device that is shorter and more compact. Since the two main faces 3 and 4 are mutually parallel, they provide reflections that are identical and symmetrical on the two faces, thereby simplifying the optical design and the manufacture of the plate; nevertheless, if the need were to be felt, the two faces 3 and 4 need not be parallel.

The imaging means situated after the second end B mainly comprise a focusing objective lens 9 (e.g. in the form of a thick converging lens) presenting an inlet surface $9_1$ that collects the light beam that has passed through the inclined face 8 of the plate 2, and an outlet surface $9_2$ through which the focused beam leaves; the inlet and outlet surfaces $9_1$ and $9_2$ of the focusing lens 9 define a magnification factor between the finger and its image.

Figure 5:
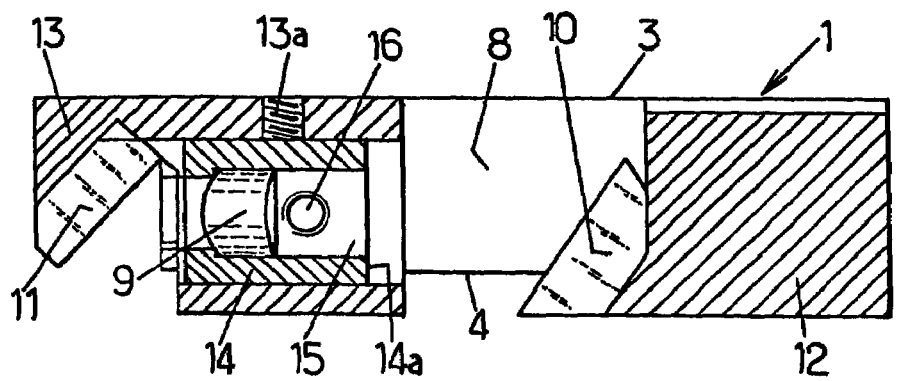
FIG. 5 is a section view on line V-V of the FIG. 1 device.

In order to ensure that the device 1 is as thin as possible, it is advantageous, as can be seen more clearly in FIGS. 3 and 5, for the focusing lens 9 to be placed in a prone position and thus to lie within the dimensional limits defined between the two main faces 3 and 4 of the plate 2. It is then appropriate for the beam that has passed through the inclined end face 8 of the plate 2 to be reflected along the axis 11 of the focusing lens 9. For this purpose, a mirror 10 is provided that has two inclinations, both relative to the normal to the face 8 and relative to the axis 11 of the focusing lens 9, as can be seen more clearly in FIGS. 3, 4, and 5. In the typical arrangement shown more specifically in FIGS. 1 to 6, the inclination of the mirror 10 is about 45° on both occasions. In FIG. 3, the path of the beam within the plate 2 is referenced $7_2$, and its path after being reflected on the mirror and on going through the focusing lens 9 is referenced $7_3$.

The focused beam coming from the focusing lens 9 then needs to reach a sensor (not shown) suitable for detecting the image of a fingerprint, said sensor being situated at the image focus of the focusing lens. To avoid the device 1 being excessively bulky, the sensor is not situated on the optical axis of the focusing lens 9, but rather under the device 1 (for example the sensor is integrated in a processor unit having the device 1 surmounted thereon). For this purpose, another mirror 11 is provided facing the outlet surface $9_2$ of the focusing lens 9 and is inclined (e.g., at about 45°) to reflect the beam $7_3$ transversely to the plate 2 (and in particular substantially perpendicularly relative thereto).

By means of these dispositions, an optical imaging device is constituted that can be made particularly compact, with the focused beam directed away from the finger-press surface. In addition, it is possible to devise various arrangements leading to remarkable compactness.

The first mirror 10 and/or the second mirror 11 may be formed on respective parts 12 and 13 which are fitted to the inclined end face 8 of the plate 2 and from which they project in line with the plate.

Advantageously, in order to limit the influence of parasitic light and in order to obtain an image of better quality, a diaphragm is provided situated upstream from and close to the focusing lens. In practice, the front face 14a of the support means described below can act as a diaphragm.

The focusing lens 9 is also secured to the end B of the plate 2 by the support means 14. By way of example, these support means 14 may be in the form of a sleeve that is secured (in particular by adhesive) to the inclined end face 8 of the plate 2, said sleeve having the lens 9 inserted therein. The lens 9 can preferably be moved axially inside the sleeve so as to make it possible to adjust the position of the image focal plane relative to the sensor. By way of example, provision can be made for the lens 9 to be secured to a plate 15 provided with a finger 16 that projects radially through a lateral slot 17 in the sleeve, as can be seen more clearly in FIGS. 4 and 5. In this concrete embodiment, it should be observed that the support means are made integrally with the projecting part 13 that incorporates the second mirror 11, said part 13 having a bore in which the above-mentioned sleeve is inserted. The sleeve can be locked in position, e.g., by using a radial lock screw engaged through the part 13 in a position 13a.

The arrangement of the optical imaging device in accordance with the invention provides the advantage of allowing various possible locations for the light source(s) as a function of available space.

Figure 6:
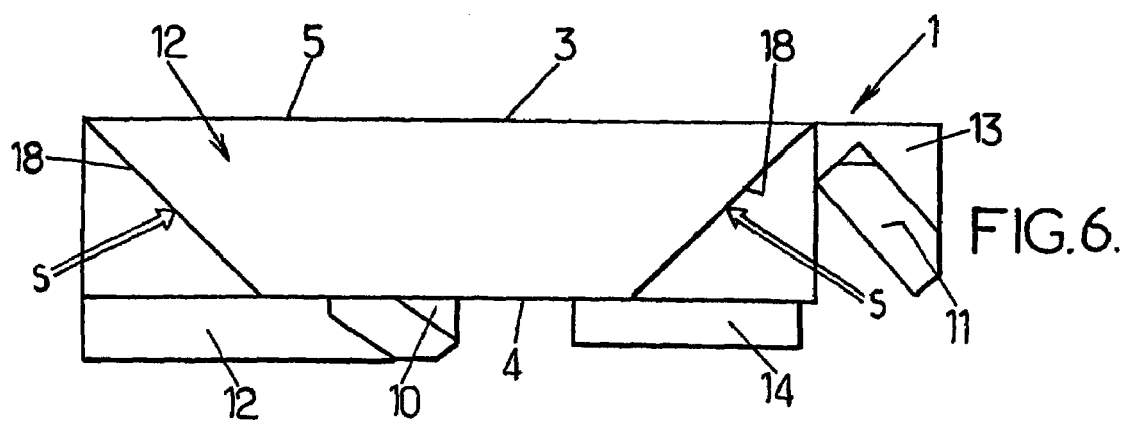
FIG. 6 is an end view showing the right-hand end of the FIG. 1 device.

In the preferred embodiment shown in FIGS. 1 to 6, the plate 2 includes at least one side face 18 towards its end A and approximately in register with the above-mentioned portion 5 of the first main face 3 forming a finger-press surface, which side face 18 is inclined at an acute angle relative to the first main face 3 of the plate 2. Preferably, the two opposite side faces 18 are inclined so as to ensure that the finger is illuminated symmetrically. In the example shown, which is best seen in FIG. 6, the inclination of both side faces 18 is about 45°. Two light sources S (e.g., in the form of light-emitting diodes) are disposed respectively facing the inclined faces 18 with their respective axes approximately perpendicular to the faces 18. In this example, the faces 8 are plane. The arrangement as proposed in this way provides bilateral illumination of the finger placed on the portion 5, i.e., illumination that is more uniform and more effective.

Figure 9:
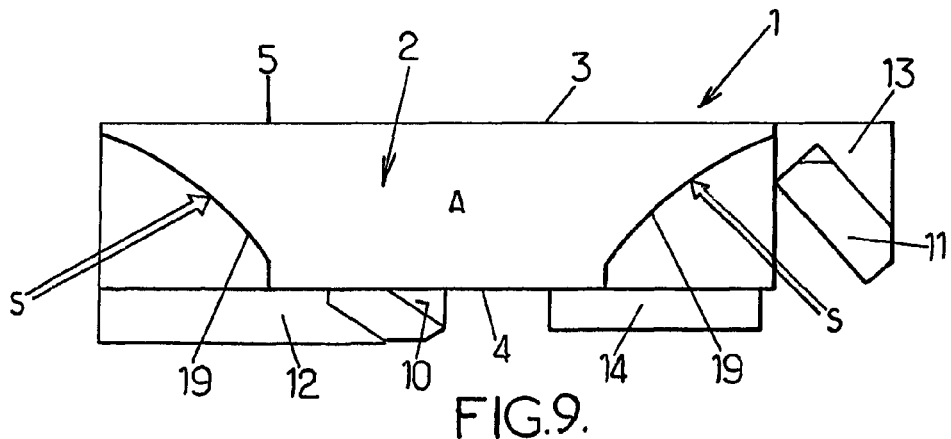
FIG. 9 is an end view analogous to the view of FIG. 6, showing a variant embodiment of the device in accordance with the invention.

It is possible to obtain illumination cones that are wider open using the same light sources by making the inclined faces in curved form with their concave faces facing outwards, as referenced at 19 in FIG. 9.

Figure 7:
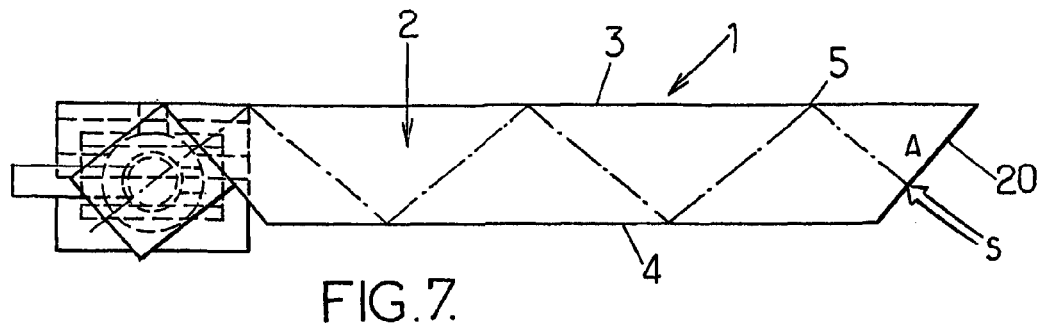
FIGS. 7 and 8 are side views analogous to the view of FIG. 2, respectively showing two variant embodiments of the device in accordance with the invention.

Another possible configuration, shown in FIG. 7, consists in illuminating the finger through the end face 20 situated at the first end A of the plate 2. For this purpose, said end face 20 is inclined at an acute angle relative to the first main face 3 of the plate 2, and the light source S is disposed facing the face 20, with its axis approximately perpendicular thereto. In the example shown, the inclination of the face 20 is about 45°. A plurality of sources S may be disposed facing the face 20 across the width of the plate 2.

Figure 8:
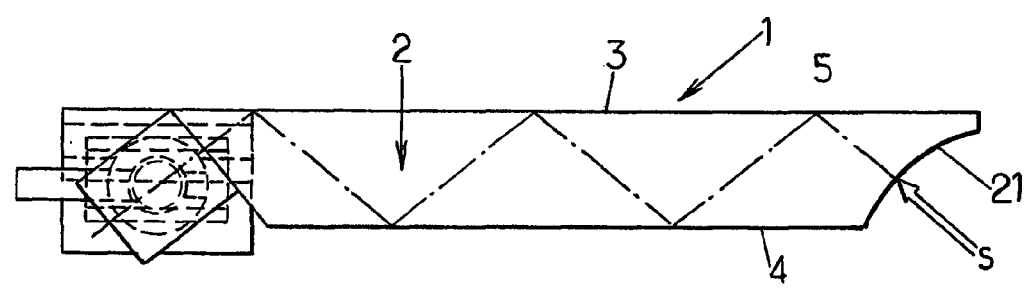

A wider illumination cone can be obtained, as shown in FIG. 8, by providing an end face 21 that is inclined and curved with its concave side facing outwards.

Figure 10:
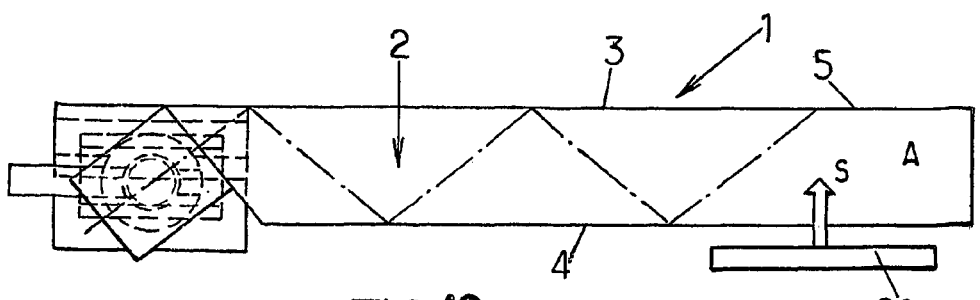
FIG. 10 is a fragmentary side view analogous to that of FIG. 2, showing a preferred variant embodiment of the device in accordance with the invention.

In a variant embodiment that is presently the preferred embodiment, the finger is illuminated, as shown in FIG. 10, by placing a non-point light source having a significant surface area in front of the bottom face 4 of the plate 2, facing said finger-press portion 5 and directed towards said portion. In practice, this light source may advantageously be a matrix 20 of light-emitting diodes, with a ground or frosted surface interposed between the matrix and the bottom face 4 of the plate 2, or formed on said plate.

From the above description, it can be understood that the projecting parts 12 and 13 respectively incorporating the mirrors 10 and 11, and also the support means 14 for supporting the focusing lens 9 can be made with dimensions that do not exceed the top and bottom limits defined by the main faces 3 and 4 respectively of the plate 2. This makes it possible to provide a device that is more compact, and above all that presents small thickness, which may be no greater than 5 mm, thus satisfying practical requirements. The device has a very small number of component parts, thereby making it easy and inexpensive to produce.

The invention claimed is:

1. A compact optical imaging device suitable for forming optical images of fingerprints, the device comprising:
    an optical plate having first and second opposite main faces, and first and second side faces respectively at opposite first and second ends of said plate, a finger-press surface is defined in at least a portion of said first main face in the vicinity of said first end of the plate;
    at least one light source facing a face of said plate at said first end thereof, and having an illumination direction directed to said finger-press surface through the plate; and imaging means including a focusing lens that has an inlet surface and an outlet surface determining a magnification factor, and that is situated downstream from the optical plate;

wherein said first and second main faces, said face in front of which the light source is situated, and the illumination direction of said light source are arranged mutually in such a manner that a light beam, reflected by a finger pressed against said finger-press surface illuminated by said light source, propagates thereafter inside the plate with multiple reflections alternately on the first and on the second main faces thereof toward said second side face;

wherein said second end face of said plate is inclined, at least in part, so that the light beam leaves the plate via said inclined end face without being subjected to significant refraction or reflection;

the focusing lens is disposed facing said inclined face of the second end of the plate, said focusing lens having an optical axis which extends substantially in a midplane of the plate between said main faces and which extends substantially parallel to said inclined face; and a first mirror is placed facing an inlet surface of said focusing lens and is oriented so as to receive a portion of the light beam from said second end face of the plate and reflect said portion of the light beam along the optical axis of said focusing lens.

2. An optical imaging device according to claim 1, further including a second mirror disposed facing the outlet surface of said focusing lens and oriented in such a manner that the light beam coming from the focusing lens is reflected transversely relative to the plate.

3. An optical imaging device according to claim 2, wherein said second mirror is oriented in such a manner that the light beam is reflected in a direction going away from the finger-press surface.

4. An optical imaging device according to claim 2, wherein the second mirror belongs to a second projecting part fitted on the end face of the second end of the plate in such a manner as to extend in line with said plate.

5. An optical imaging device according to claim 4, wherein the support means of the lens are constituted in one piece with said second projecting part incorporating the second mirror.

6. An optical imaging device according to claim 1, wherein the first and second main faces of the plate are mutually parallel.

7. An optical imaging device according to claim 1, wherein the first mirror belongs to a first projecting part fitted on the end face of the second end of the plate, in such a manner as to extend in line with said plate.

8. An optical imaging device according to claim 1, wherein it further includes a diaphragm situated upstream from and close to the focusing lens.

9. An optical imaging device according to claim 1, wherein the focusing lens is secured to the end face of said second end of the plate via support means.

10. An optical imaging device according to claim 9, wherein the support means of the focusing lens are arranged to allow the focusing lens to move along its optical axis.

11. An optical imaging device according to claim 1, wherein at its first end the plate includes an end face that is inclined at an acute angle relative to said first main face, and in that the light source is situated facing said inclined end face.

12. An optical imaging device according to claim 11, wherein the at least one inclined side face of the plate situated towards the first end thereof is curved in the thickness of the plate, with its concave face facing outwards.

13. An optical imaging device according to claim 1, wherein at said finger-press portion of the first main face of the plate, at least one side face of the plate is inclined at an angle that is acute relative to said first main face, and in that the light source is situated facing said inclined side face.

14. An optical imaging device according to claim 13, wherein both opposite side faces of the plate are inclined, and in that two light sources are situated facing respective ones of said two inclined side faces.

15. An optical imaging device according to claim 1, wherein the light source is not a point source, presenting a significant surface area and being placed facing the bottom main face of the plate, substantially facing said finger-press portion provided on the top main face, and directed towards it.

16. An optical imaging device according to claim 15, wherein the light source is a matrix of light-emitting diodes, with a ground surface interposed between the light source and the bottom face of the plate.

* * * * *